United States Patent Office 3,265,735
Patented August 9, 1966

3,265,735
MANUFACTURE OF PARA-CHLOROANILINE AND PARA-AMINOPHENOL
Walter C. Bradbury, Wichita, Kans., assignor to Frontier Chemical Company, Division of Vulcan Materials Company, Wichita, Kans., a corporation of New Jersey
No Drawing. Filed June 15, 1964, Ser. No. 375,321
5 Claims. (Cl. 260—575)

This invention relates to a new process for the simultaneous manufacture of para-chloroaniline and para-aminophenol by catalytic hydrogenation of nitrobenzene in the presence of aqueous hydrochloric acid.

p-Chloroaniline as well as p-aminophenol are well known organic chemicals which find extensive use in the manufacture of dyes as well as other commercial products. p-Chloroaniline particularly represents a valuable starting material in the manufacture of phenylene diamine which is widely used as an antioxidant, photographic developer and rubber vulcanization accelerator. p-Aminophenol itself is also widely used as an antioxidant or photographic developer. However, the manufacture of these compounds by known processes is quite expensive, which is reflected by the fact that the price of p-chloroaniline is about five times that of aniline and the price of p-aminophenol is about eight times that of aniline.

The hydrogen reduction of nitroaromatic compounds such as nitrobenzene to the corresponding aromatic amines is of course an old reaction which has been heretofore effected in many different ways. In some of the early literature on reducing nitrobenzene by means of nascent hydrogen generated in situ by reaction of a metal such as tin with hydrochloric acid the formation of substantial amounts of chloroanilines as well as aniline was reported but this has not proved to be a practical process for the production of p-chloroaniline because of the concurrent formation of substantial amounts of the less desirable ortho isomer. See Blanksma, Rec. Trav. Chim., 25, 365–72 (1906). It is also known that reduction of nitrobenzene in an aqueous system which contains a dilute mineral acid such as phosphoric or sulfuric acid results in the production of some p-aminophenol in addition to the principal reduction product, aniline. On the other hand, when such reduction is effected by catalytic hydrogenation in the presence of a noble metal catalyst rather than by the older technique of generating hydrogen by reaction of a metal such as tin with hydrochloric acid in situ, fouling or inactivation of the catalyst as well as the production of undesired by-products have presented serious problems. They have necessitated extremely careful selection and control of operating conditions such as catalyst concentration, purity of catalyst and reactants, choice of solvents, operating temperatures and pressures etc. (Hort, U.S. 3,093,685). The alternative production of chloroanilines by hydrogen reduction of chloronitrobenzenes has generally resulted in relatively low yields of the desired chloroaniline product because considerable dechlorination normally accompanies the desired reduction (Trager, U.S. 2,772,313). The presence of a separate aqueous phase has been heretofore considered particularly inimical to the production of halogenated aniline compounds in such systems and for this reason it has been heretofore recommended to use considerable concentrations of alcoholic solvents in the reaction mixture or to operate in an essentially anhydrous system when good yields of haloanilines were desired. Indeed, it has been suggested that dehalogenation can be minimized by producing the haloanilines from halogenated nitrobenzene compounds in the presence of magnesium oxide or magnesium hydroxide, i.e., in an essentially alkaline environment (Spiegler, U.S. 3,073,865).

It is an object of this invention to provide a new process whereby p-chloroaniline and p-aminophenol can be produced concurrently in good yields and in an otherwise economical manner. It is a further object of this invention to provide a process for the production of p-chloroaniline from nitrobenzene with a minimum of unwanted by-products using aqueous hydrochloric acid as the source of chlorine. It is a still further object to provide an efficient process wherein nitrobenzene is reduced with molecular hydrogen in the presence of a platinum catalyst and in the presence of an aqueous hydrochloric acid phase, yielding p-chloroaniline as the principal product and limited quantities of p-aminophenol and aniline as valuable secondary products. These and other objects, as well as the nature, scope and operation of the present invention will become apparent from the following description and appended claims. It will be understood that all proportions of materials are expressed herein on a weight basis unless otherwise indicated.

In attempting to reduce nitrobenzene in the presence of aqueous hydrochloric acid and various catalysts, initial experiments confirmed the experience of prior workers that nitrobenzene in such a system tended to kill the reaction by inactivating the catalyst or, when active reduction was successfully maintained, the product consisted essentially of p-aminophenol and aniline without any substantial yield of chloroaniline. In one instance, when a palladium catalyst was used, some p-chloroaniline was obtained but the principal product in this instance was aniline, without any appreciable formation of p-aminophenol.

After considerable further work it has now been discovered that good yields of both p-chloroaniline and p-aminophenol can be obtained by reducing nitrobenzene with molecular hydrogen in the presence of a supported platinum metal catalyst and in the presence of aqueous hydrochloric acid, provided the nitrobenzene is fed to the reaction system at such a rate that no separate organic phase is formed. More specifically, it has been discovered that this desired result can be obtained by including in the reaction mixture in addition to the platinum catalyst, a substantial amount of porous, preferably powdered, solid adsorbent such as activated charcoal and by introducing nitrobenzene into the reaction mixture gradually or incrementally in amounts such that the nitrobenzene added is essentially completely adsorbed on the solid adsorbent, without forming a separate organic phase.

In addition, particularly when operating on a batch basis, the reaction mixture preferably should contain a surface active agent such as a quaternary tetraalkyl ammonium salt to improve suspension of the solid catalyst and adsorbent in the aqueous solution. The presence of the surface active agent tends to make the reaction mixture more nearly homogeneous and improves contact between the hydrogen, the adsorbed nitrobenzene and the aqueous solution. Alternately, it is possible to operate the process continuously, for instance in a tower packed with granular catalyst and adsorbent, feeding the proper proportions of liquid nitrobenzene and hydrochloric acid at the top and hydrogen gas at the bottom, and withdrawing crude liquid product at the bottom of the tower.

It has further been discovered that the proportion of p-chloroaniline and p-aminophenol in the product can be varied by varying the proportion between the hydrochloric acid and the nitrobenzene present in the mixture. Thus by maintaining a mole ratio of at least 6:1 HCl/nitrobenzene at all times in the reaction mixture, e.g., by charging all the aqueous HCl initially while feeding the nitrobenzene into the mixture incrementally or continuously as it is being consumed, p-chloroaniline can be obtained in yields in excess of 60% based on nitrobenzene while producing aminophenol in a yield of between about 10 and 35%, aniline representing the balance.

The aqueous hydrochloric acid may be charged to the reaction in any convenient concentration, e.g., as aqueous acid containing from about 1 to about 38% HCl, preferably 5 to 25% HCl. Of course, if the reaction is carried out on a batch or semi-batch basis the concentration of HCl in the aqueous solution will be gradually reduced somewhat by the water resulting from the reduction of the nitro groups. The addition to the reaction mixture of a small amount of sulfuric acid, e.g., about 0.05 to 2% $H_2SO_4$, preferably 0.1 to 1% $H_2SO_4$, based on total inorganic aqueous acid phase present, has been found to be beneficial in giving a smoother reaction requiring less constant attention, though such addition is not required to make the process operate.

The surface active agents useful in the present process are all such agents which result in a good suspension of the powdered solid in the aqueous acid solution in the presence of hydrogen and which do not adversely affect the catalyst. Foremost among such useful agents are quaternary tetralkyl ammonium chloride or bromide salts having at least one alkyl group of sufficient chain length to be effective as a surface active agent, e.g., an alkyl chain of about 10 to 20, preferably 12 to 16, carbon atoms such as lauryl or cetyl or stearyl, the other alkyl groups being of any convenient chain length ranging from methyl or ethyl on up. Examples of this well known type of quaternary ammonium compound are cetyl trimethyl ammonium bromide, the corresponding chloride, lauryl trimethyl ammonium chloride or bromide, dilauryl dimethyl ammonium chloride and tricetyl ethyl ammonium bromide. Phenolic and alcoholic ethoxylates containing at least 62% of combined ethylene oxide per molecule, e.g., ethoxylated nonyl phenol containing about 75% combined ethylene oxide per molecule are similarly useful. On the other hand, sulfur-containing compounds tend to have an adverse effect on the activity of the platinum catalyst, and for this reason surfactants of the sulfonate and sulfate types are not particularly desirable. The surfactant may be included in the reaction mixture in only a small amount, e.g., 0.01 to 2%, preferably 0.05 to 0.5% based on the aqueous acid present. The reaction is desirably carried out at a temperature between about 50° and 135° C., preferably between 75° to 100° C., and at a relatively low pressure, e.g., at 0 to 50 p.s.i.g.

In carrying out the reaction it has been found convenient to use as the reaction vessel a 2000 ml., round bottom, 3-neck flask. To one of the necks were connected a dropping funnel and an inlet line extending near the bottom of the flask and provided with a sparger or ceramic porous disc for introducing hydrogen gas into the liquid reaction mixture. A glass thermometer was inserted into the flask through another neck to which was also connected a water-cooled reflux condenser which had an outlet line for gas attached to its upper end. Both the inlet and outlet lines were equipped with rotometers for measuring the gas flow therethrough. The flask was also equipped with a motor-driven agitator passing through the center neck, and with an electric mantle for heating the flask and contents.

Charged to the flask in each run are 300 to 600 ml. distilled water, 2 to 5 grams of powdered activated charcoal having a surface area of about 700 m.$^2$/g., 0.4 gram of cetyl trimethyl ammonium bromide, and aqueous acid and nitrobenzene in the amounts and in the manner shown in Table I below.

TABLE I

*Reduction of nitrobenzene*

| Run No. | Temp., °C. | $\phi NO_2$, Grams | Hydrochloric Acid (36%), Grams | (HCl) Acid:$\phi NO_2$, Mole Ratio | Components Out From G.C. Analysis | | | Catalyst |
|---|---|---|---|---|---|---|---|---|
| | | | | | $\phi NH_2$, Wt. Percent | p-Cl$\phi NH_2$, Wt. Percent | p-HO-$\phi$-$NH_2$, Wt. Percent | |
| 1 | 92 | 51.95 | ¹ ⁴ 46.2 | 0.96 | 11.38 | 7.03 | 81.59 | (Pt). |
| 2 | 93 | 44.7 | ¹ ⁴ 39.6 | 1.07 | 18.1 | 8.2 | 73.7 | (Pt). |
| 3 | 91 | 53.38 | ¹ ⁴ 50.6 | 1.15 | 10.76 | 12.93 | 76.31 | (Pt). |
| 4 | 94 | 30.6 | ⁴ 50.0 | 1.2 | 21.21 | 16.04 | 62.75 | (Pt). |
| 5 | 98 | 51.62 | ⁴ 62 | 1.31 | 14.43 | 24.57 | 61.00 | (Pt). |
| 6 | 91 | 50.70 | ² ⁴ 69.3 | 1.47 | 24.10 | 8.96 | 66.94 | (Pt). |
| 7 | 94 | 51.64 | ⁴ 92.4 | 2.17 | 20.09 | 27.95 | 51.96 | (Pt). |
| 8 | 90 | 50.4 | ³ ⁴ 92.4 | 2.2 | 21.99 | 14.73 | 63.28 | (Pt). |
| 9 | 94 | 51.2 | ⁴ 194 | 4.22 | 21.13 | 47.25 | 31.62 | (Pt). |
| 10 | 97 | 52.6 | ⁴ 243 | 6.5 | 18.13 | 68.41 | 13.46 | (Pt). |
| 11 | 95 | 60 | ⁵ 243 | 6.5 | 10.29 | 62.13 | 27.58 | (Pt). |
| 12 | 95 | 51.4 | ⁴ 292 | 6.4 | 15.37 | 72.64 | 12.00 | (Pt). |
| 13 | 95 | 36.3 | ⁵ 243 | 9.1 | 4.91 | 67.48 | 27.61 | (Pt). |
| 14 | 98 | 52.48 | ¹ ⁴ 57.3 | 1.12 | 79.58 | 20.42 | | (Pd). |
| 15 | 93 | 51.9 | ⁴ 128 | 3.0 | 17.07 | 19.44 | 63.49 | (Pd). |
| 16 | 93 | 14.4 | ⁴ 243 | 23.5 | 30.7 | 39.85 | 29.5 | (Pd). |

(Catalyst died after 14.4 grams addition of nitrobenzene.)

¹ HCl added in 2.2 g. increments.
² HCl added in 3.3 g. increments.
³ HCl added in 4.4 g. increments.
⁴ Plus 1.5 ml. $H_2SO_4$ (98%).
(Pt) 1 g. 1% platinum metal on charcoal (commercial product, Englehardt Industries, Newark, New Jersey).
(Pd) 1 g. 1% palladium metal on charcoal (commercial product, Englehardt Industries, Newark, New Jersey).

The amount of water included (normally about 500 cc. per 200 cc. of 22 Bé. hydrochloric acid) was always such as to keep the final acid concentration at less than 25% by weight, preferably between about 5 and 15%, e.g., about 10%. When the initial charge has been made the temperature of the mixture is raised to 85° C. while sparging nitrogen gas into the mixture at 25 cc./min. At 85° C. 1 gram of 1% platinum (or palladium) on charcoal is added. The nitrogen sparge is stopped and hydrogen at atmospheric pressure is passed into the mixture at a rate of 25 cc. per minute while the mixture is agitated. Nitrobenzene (2 ml., 2.4 grams) is added to the agitated mixture. The hydrogen vent rotometer rapidly drops to zero indicating all hydrogen is being absorbed. The temperature is maintained at 90±8° C. and hydrogen is continually sparged at 25 cc./min. When the added nitrobenzene is reduced the hydrogen in the vent climbs to a value equal to that of the input rotometer. At this time another 2 ml. increment of nitrobenzene is added to the mixture and the above procedure repeated until the required total amount of nitrobenzene is converted. At a hydrogen rate of 25 cc./minute, approximately 20 minutes is required to reduce each incremental amount of nitrobenzene. In those runs intended to produce the maximum amount of aminophenol the acid as well as the nitrobenzene were added in increments so as to maintain a low acid/nitrobenzene ratio.

When all the nitrobenzene has been charged and consumed the hydrogen sparge is stopped and the reaction mixture is blanketed with nitrogen and cooled to 50° C. The mixture is then filtered and the catalyst-carbon mixture is washed with hot water and reserved for the next run.

The aqueous filtrate is neutralized to a pH of 8 with ammonium hydroxide (or dilute sodium or potassium hydroxide), preferably under an inert atmosphere such as nitrogen to avoid oxidation of aminophenol, heated to 80–90° C. and extracted with xylene. The xylene extraction is repeated three times and the xylene extracts are combined. The extract contains aniline and p-chloroaniline formed during the reaction. Instead of xylene, similar solvents such as toluene can of course be used or, instead of extraction, it is possible to separate aniline and p-chloroaniline from p-aminophenol by subjecting the product mixture to steam distillation. After completion of the extraction or the steam distillation, the aqueous raffinate or distillation residue is cooled to about 0–5° C. to recover p-aminophenol therefrom by crystallization. In typical runs carried out in accordance with the present invention the conversion is from about 40 to 80 percent p-chloroaniline, about 10 to 60 percent p-aminophenol and usually less than 25 percent aniline. The aniline and p-chloroaniline can be recovered in substantially pure form by fractional distillation of the xylene extract.

The results obtained in various runs carried out as described above are summarized in Table I. The tabulated results show that the process of the present invention is suprisingly effective and selective in producing good yields of both p-chloroaniline and p-aminophenol from nitrobenzene. A high ratio of hydrochloric acid to nitrobenzene can be seen to favor a high yield of p-chloroaniline and for this reason operation with HCl: nitrobenzene ratios in excess of 4:1 and preferably between about 5:1 and 8:1 is particularly preferred when it is desired to maximize the production of p-chloroaniline. Conversely, p-aminophenol production can be maximized by maintaining the HCl:nitrobenzene ratio in the reaction mixture below about 2.5:1. Furthermore, a comparison between the runs employing a palladium catalyst and similar runs employing a platinum catalyst shows the surprising superiority of platinum as a catalyst for the concurrent production of p-chloroaniline and p-aminophenol with only a relatively minor amount of aniline.

The platinum catalyst used in the present invention is employed on a suitable support in a concentration of from about 0.1 to about 10 percent, preferably from about 1 to 5 percent, of the metal based on the weight of the support.

Suitable supports are well known in the art and include particularly activated carbon or charcoal, alumina, kieselguhr and Celite (diactomaceous earth), activated charcoal being especially preferred. The catalyst support employed should desirably be of high surface area type, i.e., it should have a surface area of at least about 150 square meters per gram, e.g., between about 500 and about 1100 sq. m./g. Any of the standard techniques for the preparation of platinum catalyst may be used. When operating in a batch or semi-batch system the supported catalyst is preferably in finely powdered form, to optimize contact with the reactant but pelleted or granular forms of catalyst are also useful, especially when the process is carried out on a continuous basis in a packed tower. The active component of the catalyst may be on the outside of the support or distributed throughout its mass. Catalysts of a type suitable for use in the present invention are described and exemplified in U.S. Patent 1,174,245 (platinum on charcoal); in U.S. Patent 1,111,502 (platinum on alumina); and in "Catalysis in Organic Chemistry" by Sabatier and Reid, D. Van Nostrand Co., New York, 1922 (platinum black).

The adsorbent is preferably the same substance as the catalyst support and indeed the platinum metal may be evenly distributed on all of the adsorbent present. Alternately, however, it is possible to deposit the platinum on only a portion of the total adsorbent used in the reaction and to mix the resulting supported catalyst with additional quantities of adsorbent which may be the same as or different from the catalyst support. Every adsorbent of course has a characteristic adsorbent capacity which can be readily determined by simple empirical tests. The amount of nitrobenzene present at any one time in the process of the present invention should never be in excess of the amount which the adsorbent present in the reaction system can adsorb without allowing formation of a separate organic phase in the reaction mixture. Except for this limitation, however, the amount of catalyst and adsorbent used is not particularly important. Conveniently, for instance, about 1 to 10 or 15 grams of adsorbent (which may support about 0.1 to 10% platinum) can be charged per 1000 ml. of aqueous acid present in the reaction zone.

The invention having been described above, its patentable subject matter is particularly pointed out in the appended claims.

What is claimed is:

1. A process for the manufacture of p-chloroaniline as the principal product and p-aminophenol as a secondary product which comprises maintaining aqueous hydrochloric acid containing about 5 to 38% HCl, a solid adsorbent and a platinum metal catalyst in intimate contact in a reaction zone at a reaction temperature of between about 50° to 135° C. and at a pressure sufficient to maintain an aqueous liquid phase in said reaction zone but not greater than 50 p.s.i.g., adding nitrobenzene to said reaction zone in a proportion such as to give an HCl/nitrobenzene ratio between 4/1 and 8/1 and such that it is substantially completely adsorbed on said adsorbent without forming a separate organic phase in said reaction zone, thereby forming a reaction mixture which comprises an aqueous phase and a nitrobenzene-containing solid phase, contacting molecular hydrogen with said reaction mixture at said reaction temperature, mechanically separating the solid adsorbent and catalyst from the resulting aqueous liquid product, and recovering para-chloroaniline and para-aminophenol from said aqueous product.

2. A process according to claim 1 wherein hydrogen is introduced continuously into the reaction zone and wherein nitrobenzene is added to said reaction zone as required to consume essentially all of the hydrogen being introduced.

3. A process according to claim 1 wherein said catalyst consists essentially of platinum metal supported on activated carbon.

4. A process according to claim 3 wherein said adsorbent is activated carbon having a surface area of between about 500 and 1100 m.²/gram and is present in the reaction zone in a proportion of from about 1 to about 10 grams per 1000 ml. of aqueous hydrochloric acid solution.

5. A process for the preparation of a product mixture rich in para-chloroaniline and containing a minor proportion of para-aminophenol which consists essentially in maintaining an aqueous phase containing 5 to 25% HCl and 0.05 to 1% $H_2SO_4$, a platinum metal hydrogenation catalyst and activated charcoal having a surface area of between about 500 and 1100 m.² gram as an intimate mixture in a reaction zone at a temperature between 75° and 100° C. and at a pressure sufficient to maintain an aqueous liquid phase in said reaction zone but not greater than 50 p.s.i.g., adding nitrobenzene to said reaction zone in a proportion such that it is substantially completely adsorbed on said charcoal without forming a separate organic phase in said reaction zone, thereby forming a reaction mixture which consists essentially of an aqueous acid phase and a nitrobenzene-containing solid phase, said activated charcoal being present in the reaction zone in a proportion of from about 1 to 10 grams per 1000 ml. of aqueous acid phase and said nitrobenzene being added to said reaction zone in a proportion such as to maintain the HCl/nitrobenzene mole ratio in said zone between about 5:1 and 8:1, contacting molecular hydrogen with said reaction mixture at said reaction temperature, mechanically separating said catalyst and charcoal from the resulting aqueous liquid mixture, and recovering para-chloroaniline and para-aminophenol from said liquid mixture.

References Cited by the Examiner

UNITED STATES PATENTS

| | | | |
|---|---|---|---|
| 2,198,249 | 4/1940 | Henke et al. | 260—575 X |
| 2,765,342 | 10/1956 | Spiegler | 260—575 |
| 2,884,458 | 4/1959 | Fidler | 260—580 |

OTHER REFERENCES

Prager et al.: "Beilstein's Handbuch der Organischen Chemie," volume 12, page 607 (1929).

Robertson et al.: "Journal Organic Chemistry," volume 5, pages 142–5 (1940).

References Cited by the Applicant

UNITED STATES PATENTS

| | | |
|---|---|---|
| 2,772,313 | 11/1956 | Trager. |
| 2,884,458 | 4/1959 | Fidler. |
| 3,073,865 | 1/1963 | Spiegler. |
| 3,093,685 | 6/1963 | Hort et al. |

OTHER REFERENCES

Blanksma: Rec. Trav. Chim., 25, 365–372 (1906).

CHARLES B. PARKER, *Primary Examiner.*

JOSEPH P. BRUST, *Examiner.*

ROBERT V. HINES, *Assistant Examiner.*